J. F. McELROY.
ADJUSTABLE AUTOMATIC STEAM REGULATOR.
APPLICATION FILED SEPT. 16, 1908.
996,271.
Patented June 27, 1911.
2 SHEETS—SHEET 1.
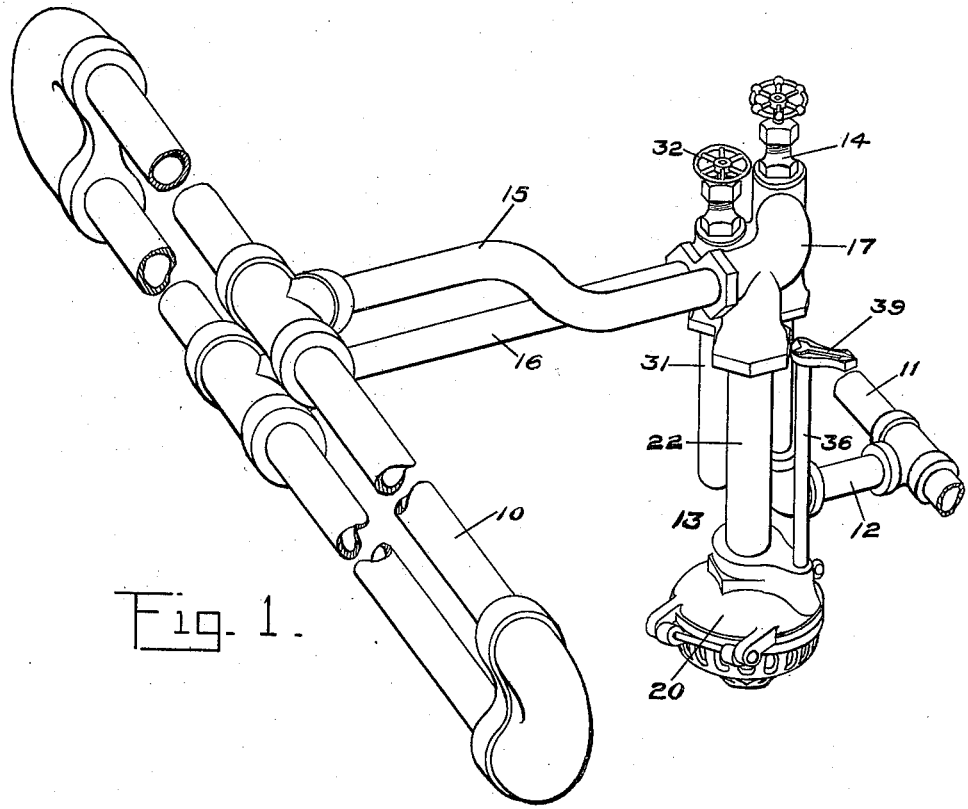

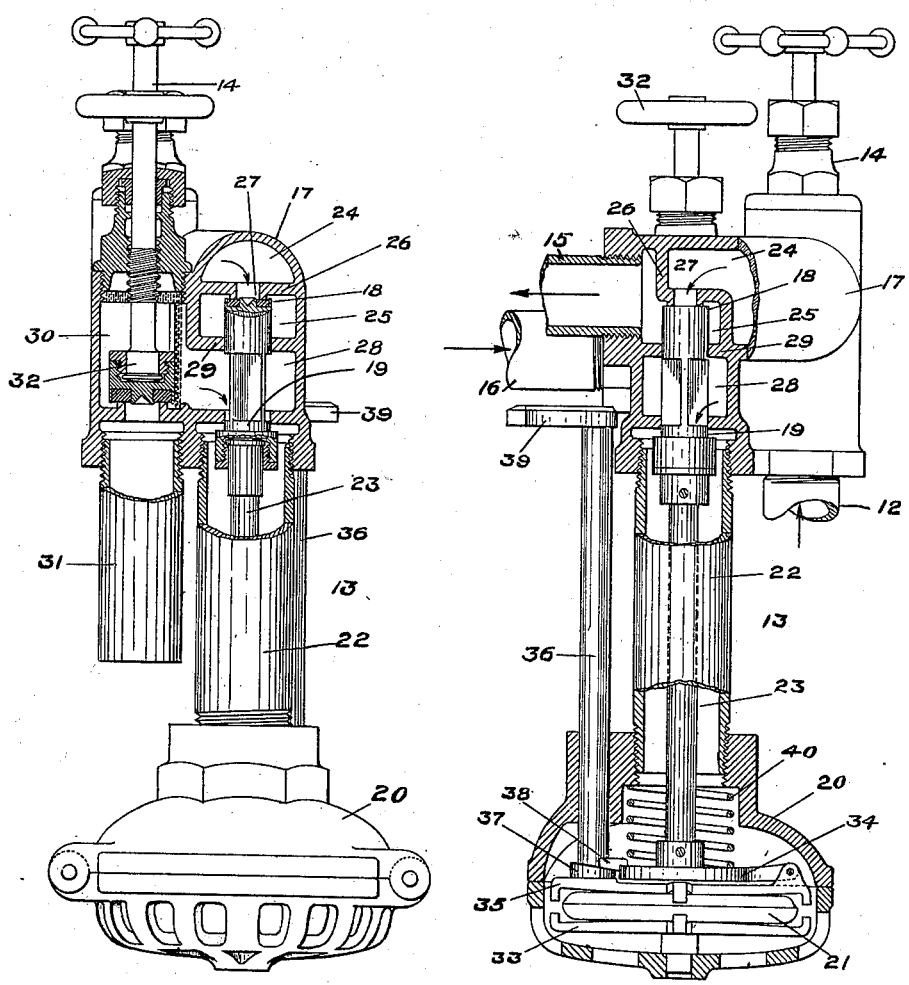

UNITED STATES PATENT OFFICE.

JAMES F. McELROY, OF ALBANY, NEW YORK, ASSIGNOR TO CONSOLIDATED CAR-HEATING COMPANY, OF ALBANY, NEW YORK, A CORPORATION OF WEST VIRGINIA.

ADJUSTABLE AUTOMATIC STEAM-REGULATOR.

996,271.  Specification of Letters Patent.  Patented June 27, 1911.

Original application filed August 31, 1901, Serial No. 73,981. Divided and this application filed September 16, 1908. Serial No. 453,256.

*To all whom it may concern:*

Be it known that I, JAMES F. MCELROY, a citizen of the United States, residing at Albany, in the county of Albany and State of New York, have invented certain new and useful Improvements in Adjustable Automatic Steam-Regulators, of which the following is a specification.

This invention relates to thermostatic regulators for steam heating systems including admission regulators and traps as well as regulators combining these two functions.

The drawing illustrates a regulator in which the thermostat controls both the admission and discharge valves for the radiator.

My object is to provide improved adjusting-means for varying the standard of regulation or changing the relation of the thermostat to either or both of the valves controlled by it.

This application is a division and continuation of my application filed August 31, 1901, and patented April 7, 1908, No. 884,287.

Of the accompanying drawings, Figure 1 represents a perspective view showing a steam-heating system provided with my adjustable automatic regulator. Fig. 2 is a top plan view of the regulator. Fig. 3 is an elevation, partly in section, on line 3—3 of Fig. 2. Fig. 4 is a section, on line 4—4 of Fig. 2.

In the drawings, 10 may represent a car radiator and 11 the train-pipe for supplying steam to the radiator, these having their customary locations the one within the car and the other outside under the car floor.

12 is the branch admission-pipe leading from train-pipe 11 through the automatic regulator 13 and having a hand-controlled stop-valve 14 anterior to the automatic admission-valve of the regulator whereby the supply of steam may be admitted to the regulator or shut off therefrom, and may also be adjusted by a partial opening of the hand-valve when desired.

15 is the continuation of the admission-pipe, leading from the automatic regulator to the radiator, and 16 is a discharge pipe for conducting the steam and water of condensation from the radiator through the regulator to the atmosphere.

The regulator 13 is made with an upper casing 17 containing admission and discharge valves 18, 19 which automatically control the supply and exhaust respectively of the heating medium, a lower casing 20 containing an expansible thermostatic element or cell 21 of the kind used in car traps, located substantially at the atmospheric outlet of the system, and a connecting pipe or conduit 22 through which the efflux of the radiator, which has been released past the exhaust valve 19, is discharged onto the thermostat 21. A rod 23 extends upwardly from the thermostat 21 to the valves 18, 19 to communicate to said valves the expanding and contracting movements of the thermostat.

In the upper casing 17 are cast an antechamber 24 open to the admission-pipe 12, a supply chamber 25 open to the radiator pipe 15, the two being separated by a partition 26 having a port 27 surrounded by a valve-seat against which the admission-valve 18 is adapted to close; and a discharge chamber 28 open to the radiator discharge pipe 16 and separated from supply-chamber 25 by a partition 29 through which the cylindrical stem of admission-valve 18 passes. The admission-valve 18 in this instance is a positively-seating valve, while the discharge valve 19 is represented as a short piston-valve operating with a close fit in the port which connects discharge-chamber 28 with the outlet conduit 22. There is also shown a blow-off chamber 30 formed in the upper casing between discharge-chamber 28 and the radiator discharge-pipe 16 and having an outlet port leading directly to the atmosphere through a short spur pipe 31, said port being controlled by a hand blow-off valve 32.

At the bottom of the regulator, thermostat 21 is supported on a lower spider 33 resting on the hinged foraminous bottom half of the casing 20, and the rod 23 is loosely stepped on an adjusting plate 34 pivoted to an upper spider 35 which rests on the thermostat. Spider 35 directly supports an adjusting rod 36 having on its lower end a cam 37 on which rests a lug 38 formed on the plate 34, and rod 36 passes upwardly through a bearing in the thermostat casing and carries at its upper end a handle 39 which is accessible inside of the car. A spring 40 bears downwardly on the adjusting plate 34.

As handle 39 is turned, the lug 38 on adjusting plate 34 rides up or down on cam 37, and thus the length of the connection between the thermostat 21 and the valves 18, 19 is altered. As both valves are here fixed on one stem, they are simultaneously operated while being maintained at a fixed distance apart. This arrangement has the advantage of securing an equal adjustment of the valves by a single operation, although in a broad sense I do not limit myself thereto.

The above-described adjustment enables me to alter the standard of automatic regulation at will and secure a low temperature and pressure in the steam-heating system for moderate weather and a higher temperature and pressure for colder weather, the temperature and pressure for which the regulator is adjusted being automatically maintained by the thermostat 21, acting on both valves 18, 19 in response to the opposing influence of the hot radiator discharge on the one hand and the cool outer atmosphere on the other hand, the one influence tending to expand the thermostat and close the valves and the other tending to contract it and open the valves. With a lengthened connection between thermostat and valves, it requires only a relatively small expansion of the thermostat to close the valves, and this is effected by a relatively cool or scanty discharge. Thus the steam is kept at a low pressure in the radiator for moderate weather, and the adjustment may obviously be carried so far that there is practically atmospheric pressure or a vacuum in the radiator, although the train-pipe 11 carries its usual high pressure, say 60 pounds or thereabout. On the other hand, when the connection is shortened, it requires a hotter discharge and greater thermostatic expansion to close the valves, and more steam at a higher pressure will be admitted past the inlet valve 18. The pressure and temperature in the radiator will thus be kept higher for colder weather, and the radiator pressure may approximate that in the train-pipe 11. By a suitable adjustment of the hand-valve 14 I am able to roughly control the pressure of steam supplied to the regulator and supplement its automatic action in maintaining the desired temperature conditions within the car or other apartment.

It has heretofore been proposed to control the supply and discharge valves for a radiator by means of a thermostat located in the path of the radiator discharge at a point anterior to the discharge valve, so that the thermostat is directly subject only to the temperature within the heating system. It has further been proposed to employ adjustable connections between the thermostat and valves on such regulators. I do not claim such an arrangement, and the same differs in principle from my present invention.

Various changes may be made in the particular embodiment described. For example, it is possible to employ various kinds of thermostats.

The accessibility of the manual adjusting device from within the car, while not perhaps essential, is considered advantageous, as it enables the brakeman of the car or anyone within the apartment to be heated, to change the standard of regulation from the inside, or while the car is running, although the thermostat is located on the outside. This feature of accessibility I consider to apply broadly to outside-thermostat regulators having means for changing from high-pressure to low-pressure, or otherwise varying the standard of automatic regulation.

What I claim is:—

1. A thermostatic regulator for steam heaters comprising a casing having a discharge passage, a valve in the upper portion of said casing and provided with a depending stem, a thermostatic vessel located in the lower part of said casing in the path of the discharge therefrom, an adjusting plate interposed between said thermostat and said valve stem and engaging both of them, and means for varying the position of said adjusting plate to regulate the closing point of the valve with relation to a given temperature affecting the thermostat, said position varying means including an operating device extending upwardly to a point adjacent the upper end of the casing.

2. In a thermostatic regulator for steam heating systems the combination of an upright regulator casing having a valve casing at its upper end containing a valve, a thermostat casing at its lower end containing an expansion vessel, and a connecting tube for the passage of the radiator discharge, a stem extending from said valve downwardly through the regulator casing, a pair of hinged plates interposed between said stem and the expansion vessel, a spring interposed between the regulator casing and the upper plate, a cam interposed between the two plates, and a rod for rotating said cam extending upwardly through the wall of the thermostat casing.

3. A thermostatic regulator for steam heaters comprising a casing having a discharge passage, a valve in the upper portion of said casing and provided with a depending stem, a thermostatic vessel located in the lower part of said casing in the path of the discharge therefrom, an adjusting plate interposed between said thermostat and said valve stem and engaging both of them, a cam for varying the position of said plate, and means for operating said cam.

4. A thermostatic regulator for steam heaters comprising a casing having a discharge passage, a valve in the upper portion of said casing and provided with a depending stem, a thermostatic vessel located in the lower part of said casing in the path of the discharge therefrom, an adjusting plate interposed between said thermostat and said valve stem and engaging both of them, said plate being provided with an overhanging lug, and a rotary operating rod provided with a cam extended beneath said lug.

In testimony whereof I have hereunto set my hand in the presence of two subscribing witnesses, this ninth day of September, 1908.

JAMES F. McELROY.

Witnesses:
BEULAH CARLE,
ERNEST D. JANSEN.